United States Patent
Katiyar et al.

(10) Patent No.: US 12,457,107 B2
(45) Date of Patent: Oct. 28, 2025

(54) CROSS-VENDOR DEVICE AUTHENTICATION FOR MULTI-VENDOR INFRASTRUCTURE

(71) Applicant: Dell Products L.P., Round Rock, TX (US)

(72) Inventors: Shivendra Katiyar, Bangalore (IN); Naman Goel, Bangalore (IN); Rishi Mukherjee, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 18/422,275

(22) Filed: Jan. 25, 2024

(65) Prior Publication Data

US 2025/0247232 A1  Jul. 31, 2025

(51) Int. Cl.
*H04L 9/32* (2006.01)
*H04L 9/08* (2006.01)

(52) U.S. Cl.
CPC .......... *H04L 9/3213* (2013.01); *H04L 9/0866* (2013.01)

(58) Field of Classification Search
CPC ............................. H04L 9/3213; H04L 9/0866
See application file for complete search history.

(56) References Cited

U.S. PATENT DOCUMENTS

| | | | | |
|---|---|---|---|---|
| 8,775,810 B1 * | 7/2014 | Snodgrass | ................ | H04L 9/08 713/175 |
| 9,210,051 B2 * | 12/2015 | Kruglick | ............. | G06Q 30/018 |
| 9,397,827 B2 * | 7/2016 | O'Hare | ................ | G06F 21/606 |
| 9,503,452 B1 * | 11/2016 | Kumar | ................ | H04L 63/0838 |
| 10,122,709 B2 * | 11/2018 | Momchilov | ........ | H04L 63/0884 |
| 11,777,922 B2 | 10/2023 | Katiyar et al. | | |
| 2006/0075103 A1 * | 4/2006 | Cromer | ................ | G06Q 10/10 709/225 |
| 2009/0292641 A1 * | 11/2009 | Weiss | ................ | G06F 21/6245 705/72 |
| 2013/0138961 A1 * | 5/2013 | Tsuji | ................ | H04L 9/0816 713/171 |

(Continued)

OTHER PUBLICATIONS

A. Ometov et al., "Multi-Factor Authentication: A Survey," Cryptography, vol. 2, No. 1, 2018, 31 pages.

(Continued)

*Primary Examiner* — J. Brant Murphy
(74) *Attorney, Agent, or Firm* — Ryan, Mason & Lewis, LLP

(57) ABSTRACT

Techniques described herein relate to a method for establishing communication sessions. The method may include sending, by a first data node, a request to establish a session to a second data node, wherein the request is encrypted using a compound certificate associated with a data cluster; obtaining, an encrypted token from the second data node; verifying the encrypted token using the compound certificate; performing steward selection to select a third data node to be a steward; generating a unique key and providing a copy of the unique key to the steward; generating an encrypted authentication token using the unique key; sending the encrypted authentication token to the steward; obtaining an authentication token from the second data node, wherein the authentication token is decrypted; verifying the authentication token using the encrypted authentication token; and performing remaining communications associated with the session using the steward.

20 Claims, 9 Drawing Sheets

(56) References Cited

U.S. PATENT DOCUMENTS

| | | | | |
|---|---|---|---|---|
| 2014/0325047 | A1* | 10/2014 | Kruglick | G06Q 10/10 709/223 |
| 2014/0380445 | A1* | 12/2014 | Tunnell | H04L 63/18 726/7 |
| 2016/0086176 | A1* | 3/2016 | Silva Pinto | H04W 12/106 705/44 |
| 2016/0337326 | A1* | 11/2016 | O'Hare | H04L 9/0844 |
| 2017/0126661 | A1* | 5/2017 | Brannon | H04L 63/0815 |
| 2018/0159942 | A1* | 6/2018 | Chen | H04L 67/51 |
| 2020/0244647 | A1* | 7/2020 | Liu | H04L 9/0894 |
| 2021/0328874 | A1* | 10/2021 | Jacobson | H04L 61/5014 |
| 2021/0336772 | A1* | 10/2021 | Debata | H04L 9/0894 |
| 2022/0385456 | A1* | 12/2022 | Katiyar | H04L 9/0825 |
| 2023/0110856 | A1* | 4/2023 | Katiyar | H04L 9/0869 713/168 |
| 2023/0116820 | A1* | 4/2023 | Banerjee | H04L 47/829 709/226 |
| 2024/0348592 | A1* | 10/2024 | Fraser Brown | H04L 63/101 |
| 2025/0280295 | A1* | 9/2025 | Garcia Morchon | H04W 12/0431 |

OTHER PUBLICATIONS

Wikipedia, "Mulit-factor Authentication," https://en.wikipedia.org/wiki/Multi-factor_authentication, Sep. 5, 2021, 12 pages.

Averon, "Seamless MFA," https://averon.a2hosted.com/seamless-mfa/, Accessed Oct. 12, 2021, 7 pages.

M. D. Corner et al., "Zero-Interaction Authentication," Proceedings of the 8th Annual International Conference on Mobile Computing and Networking, Sep. 23-28, 2002, 11 pages.

Wikipedia, "Link Layer Discovery Protocol," https://en.wikipedia.org/wiki/Link_Layer_Discovery_Protocol, Jun. 14, 2022, 4 pages.

IEEE Standards Association, "IEEE Standard for Local and Metropolitan Area Networks—Station and Media Access Control Connectivity Discovery," IEEE Std 802.1AB-2016, Jan. 29, 2016, 146 pages.

Cisco Systems Inc., "Configuring DHCP Snooping," Cisco Nexus 7000 Series NX-OS Security Configuration Guide, Release 4.1, Chapter 15, https://www.cisco.com/c/en/us/td/docs/switches/datacenter/sw/4_1/nx-os/security/configuration/guide/sec_nx-os-cfg/sec_dhcpsnoop.html, Accessed Oct. 5, 2022, 20 pages.

Juniper Networks, Inc., "Understanding and Using Trusted DHCP Servers," https://www.juniper.net/documentation/us/en/software/junos/security-services/topics/topic-map/port-security-trusted-dhcp-server.html, Feb. 18, 2021, 6 pages.

R. Droms, "Dynamic Host Configuration Protocol," https://datatracker.ietf.org/doc/html/rfc2131, Network Working Group, Request for Comments: 2131, Mar. 1997, 45 pages.

Wikipedia, "Dynamic Host Configuration Protocol," https://en.wikipedia.org/wiki/Dynamic_Host_Configuration_Protocol, Dec. 29, 2022, 25 pages.

U.S. Appl. No. 18/094,442 filed in the name of Naman Goel et al. on Jan. 9, 2023, and entitled "Secure and Dynamic Assignment of Network Addresses to Network Devices in an Information Processing System.".

U.S. Appl. No. 18/325,245 filed in the name of Naman Goel et al. on May 30, 2023, and entitled "Authentication System for Cloud Infrastructure Using Keys Derived from Device Component Information.".

"Device Onboarding", fido Alliance, webpage <https://fidoalliance.org/device-onboarding/>, 3 pages, October 3, 2023, retrieved from Internet Archive Wayback Machine <https://web.archive.org/web/20231003101358/https://fidoalliance.org/device-onboarding/>, on Mar. 19, 2024.

* cited by examiner

CROSS-VENDOR DEVICE AUTHENTICATION FOR MULTI-VENDOR INFRASTRUCTURE

BACKGROUND

Computing devices may provide services for users. To provide the services, the computing devices may generate data. The computing devices may provide and obtain data from other computing devices during communication sessions. The data may be important to the user. Authenticating computing devices for communications services may be performed to protect the data and the computing devices.

SUMMARY

In general, in one aspect, the embodiments disclosed herein relate to a method performed to establish communication sessions. The method includes sending, by a first data node of a data cluster, a request to establish a session to a second data node of the data cluster, wherein the request is encrypted using a compound certificate associated with the data cluster; obtaining, in response to the request, an encrypted token from the second data node; verifying the encrypted token using the compound certificate; performing steward selection to select a third data node of the data cluster to be a steward; generating a unique key and providing a copy of the unique key to the steward; generating an encrypted authentication token using the unique key; sending the encrypted authentication token to the steward; obtaining an authentication token from the second data node, wherein the authentication token is decrypted; verifying the authentication token using the encrypted authentication token; and performing remaining communications associated with the session using the steward.

In general, in one aspect, the embodiments described herein relate to a non-transitory computer readable medium which includes computer readable program code, which when executed by a computer processor enables the computer processor to perform a method for establishing communication sessions. The method includes sending, by a first data node of a data cluster, a request to establish a session to a second data node of the data cluster, wherein the request is encrypted using a compound certificate associated with the data cluster; obtaining, in response to the request, an encrypted token from the second data node; verifying the encrypted token using the compound certificate; performing steward selection to select a third data node of the data cluster to be a steward; generating a unique key and providing a copy of the unique key to the steward; generating an encrypted authentication token using the unique key; sending the encrypted authentication token to the steward; obtaining an authentication token from the second data node, wherein the authentication token is decrypted; verifying the authentication token using the encrypted authentication token; and performing remaining communications associated with the session using the steward.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
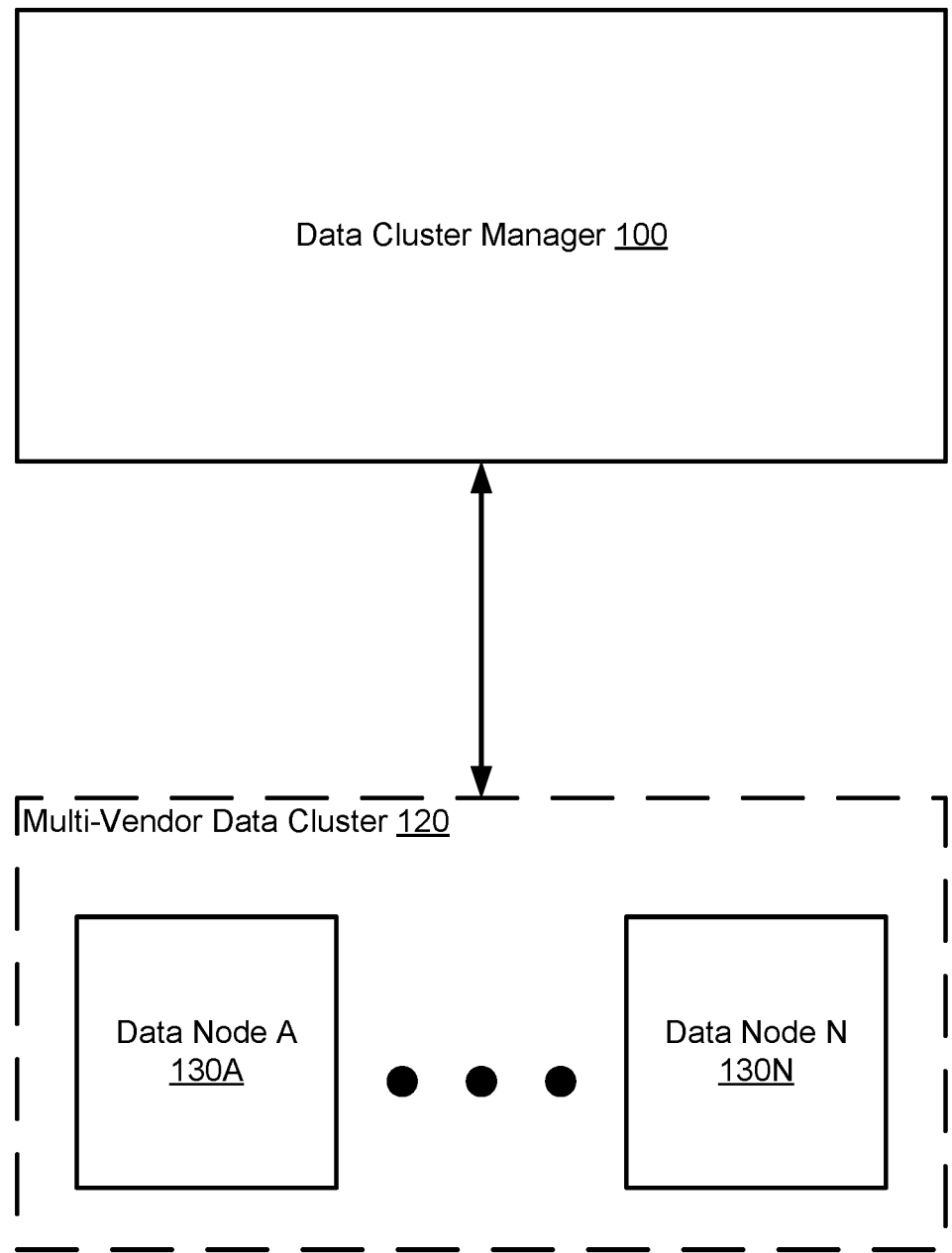
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and/or non-transitory computer readable mediums for authenticating data nodes in a multi-vendor data cluster.

Cloud and edge infrastructures may hold multiple infrastructure components from different solution vendors. Usually all these infrastructure (e.g., network, compute, storage) devices have a management module (e.g., the compute server may have its own operating system (OS), the network switch may also have its own embedded network OS, and storage devices may include their own management modules). These different devices may be offered by cloud infrastructure vendors as solution where all these components are being validated together as a unit before being released for production workload. Most of these infrastructure devices may be connected to a centralized management node or cloud management service. For manageability and security, the management node or service or another requester may need to know the credentials of the infrastructure components, and the credentials may be stored locally or remotely. Having credentials at centralized locations may cause following problems: (i) if somebody gets access to a repository, then the whole infrastructure's security will be compromised, (ii) any change in credentials needs to be updated to the management node, (iii) there is no way for infrastructure components to interact with each other, for example, a computer server cannot push configuration to networking switch since it does not have the knowledge of the credentials, and (iv) addition or replacement of new a node is tedious process as that requires on-boarding of a new node in the management node, making it compliant with credentials and management rules of the infrastructure.

To address, at least in part, the aforementioned issues discussed above, embodiments disclosed herein relate to systems, methods, and/or non-transitory computer readable mediums for an autonomous and distributed credential-less management of cloud infrastructure, which may utilize a trusted secure channel for management data exchange among various infrastructure devices. The management node/service may securely compose a compound certificate which contains certificates belonging to all participating vendors. The compound certificate may then be securely transferred to all managed devices using vendor plugins installed in the management node. A managed device may then be able to decrypt data (encrypted using single vendor certificate) using the compound certificate but will not be able to decipher the compound certificate itself. Using this, a device may generate a token for communicating with a peer, encrypt it using its own certificate and then share it with the peer system. The peer system can then decrypt it using the compound certificate and present it as part of a successful check of authentication challenge. Each node/device in the cluster may carry vendor cloud agent. Only one vendor agent may be in active state, others will remain in a passive state to maintain high availability in cluster. This agent may be responsible for API calls with cloud service, and that will be used for any onboarding request, node removal requests, etc.

In one or more embodiments, vendor information and device details may be part of a data packet and shared with all the neighbors in the infrastructure by a device. The management controller or management module present on the device may collect the data packet and update the vendor cloud agent with the information about the vendor. The vendor cloud agent available on the cluster coordinator/manager may communicate with the management module available on a device and pull certificate details of a device that will be verified using the cloud service. The cloud service may assess the certificate thumbprint for validation purposes for the device. The cloud service may generate a composite key based on vendor information that will be synchronized with the vendor agent and then the composite key may be propagated to the management module of the device. This composite key may be used for encryption of authentication code and can be decrypted only by participating nodes. The key exchange between communicating nodes may be facilitated by a steward chosen within the cluster for the session.

FIG. 1A shows a diagram of a system in accordance with one or more embodiments disclosed herein. The system may include a data cluster manager (100) and a multi-vendor data cluster (MVDC) (120). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the data cluster manager (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the data cluster manager (100) described herein and/or all, or a portion, of the methods illustrated in FIGS. 2A-5. The data cluster manager (100) may be implemented using other types of computing devices without departing from the embodiments disclosed herein. For additional details regarding computing devices, refer to FIG. 6.

The data cluster manager (100) may be implemented using logical devices without departing from the embodiments disclosed herein. For example, the data cluster manager (100) may include virtual machines that utilize computing resources of any number of physical computing devices to provide the functionality of the data cluster manager (100). The data cluster manager (100) may be implemented using other types of logical devices without departing from the embodiments disclosed herein.

In one or more embodiments, the data cluster manager (100) may include the functionality to, or otherwise be programmed or configured to, perform data cluster management services for the MVDC (120). The data cluster management services may include generating, maintaining, and/or deleting compound certificates for the MVDC (120). The data cluster management services may further include obtaining vendor certificates from vendors (not shown in FIG. 1A) or other entities (not shown in FIG. 1A) associated with the vendors and deleting old vendor certificates. The data cluster management services may further include obtaining, updating, and/or deleting data node information obtained from data nodes (130A, 130N) of the MVDC (120). The data cluster management services may include other and/or additional services without departing from embodiments disclosed herein. The data cluster manager (100) may include the functionality to perform all, or a portion, of the methods discussed in FIGS. 2A-5. The data cluster manager (100) may include other and/or additional functionalities without departing from embodiments disclosed herein. For additional information regarding the data cluster manager (100), refer to FIG. 1C.

In one or more embodiments disclosed herein, the multi-vendor data cluster (MVDC) (120) may refer to a collection of data nodes (e.g., 130A, 130N) that may be, in whole or in part, generated, configured, manufactured, or otherwise prepared by multiple vendors. The data nodes of the MVDC (120) may communicate (e.g., transmit information or data) amongst each other to perform computer implemented services for users of the MVDC (120). The MVDC (120) may be implemented as a cloud computing environment without departing from embodiments disclosed herein.

In one or more embodiments disclosed herein, each of the data nodes (e.g., 130A, 130N) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the data nodes (e.g., 130A, 130N) described herein and/or all, or a portion, of the methods illustrated in FIGS. 2A-5. The data nodes (e.g., 130A, 130N) may be implemented using other types of computing devices without departing from the embodiments disclosed herein. For additional details regarding computing devices, refer to FIG. 6.

The data nodes (e.g., 130A, 130N) may be implemented using logical devices without departing from the embodiments disclosed herein. For example, the data nodes (e.g., 130A, 130N) may include virtual machines that utilize computing resources of any number of physical computing devices to provide the functionality of the data nodes (e.g., 130A, 130N). The data nodes (e.g., 130A, 130N) may be implemented using other types of logical devices without departing from the embodiments disclosed herein.

In one or more embodiments disclosed herein, the data nodes (e.g., 130A, 130N) may be programmed to or otherwise configured to perform computer implemented services for users (not shown). The computer implemented services may include email services, text processing services, database services, inferencing services, calendar services, video processing services, and/or machine learning model training services. The computer implemented services may include other and/or additional types of computer implemented services without departing from embodiments disclosed herein. To perform the aforementioned computer implemented services, the data nodes (e.g., 130A, 130N) may communicate with each other (e.g., transmit information and data back and forth). These communications may be authenticated via methods 2A-5 discussed below. For additional information regarding the data nodes (e.g., 130A, 130N), refer to FIG. 1B.

Although the system of FIG. 1A is shown as having a certain number of components (e.g., 100, 120), in other embodiments disclosed herein, the system may have more or fewer components. For example, the functionality of each component described above may be split across components or combined into a single component. Further still, each component may be utilized multiple times to carry out an iterative operation.

Figure 1B:
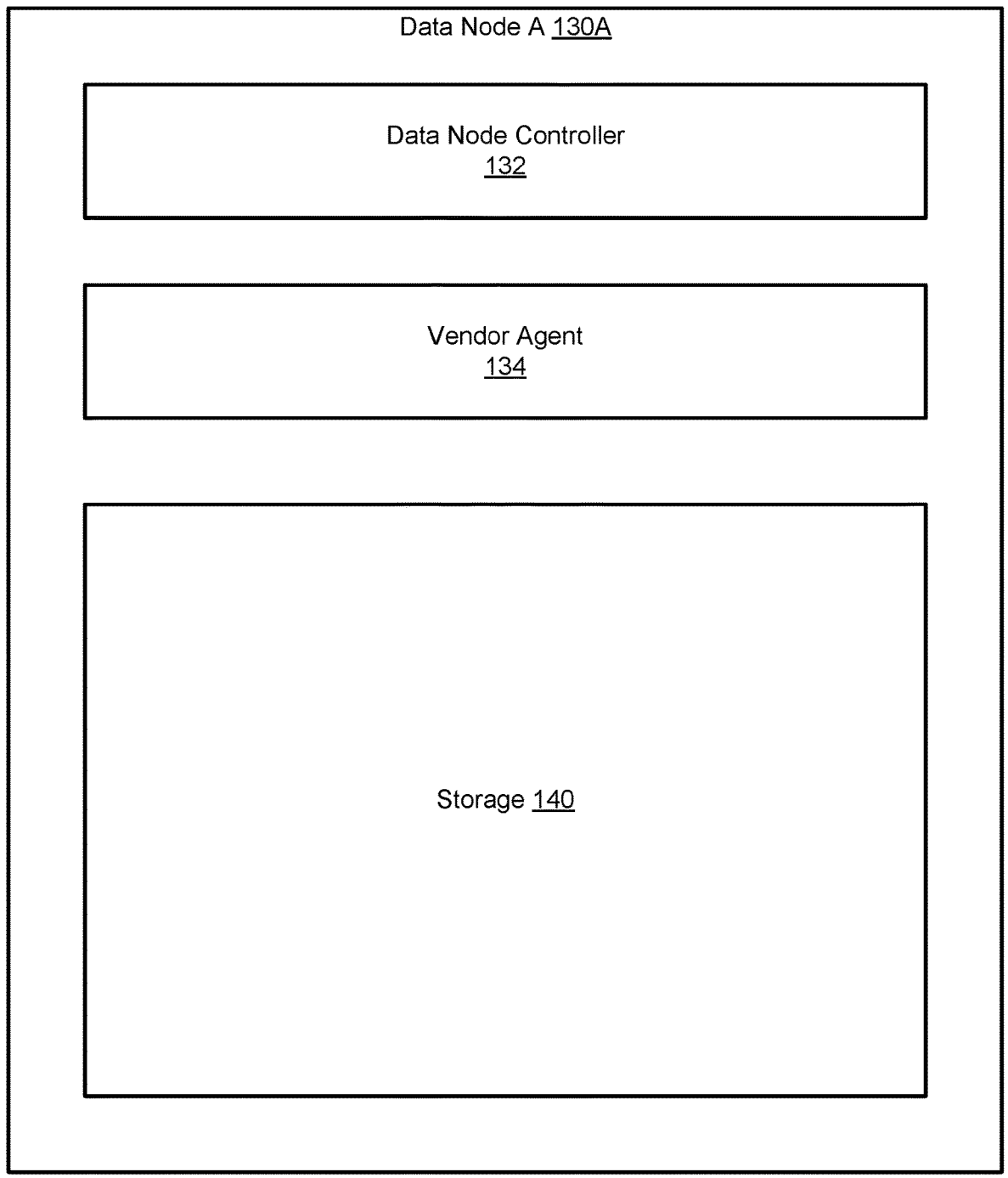
FIG. 1B shows a diagram of a data node in accordance with one or more embodiments disclosed herein.

FIG. 1B shows a diagram of a data node in accordance with one or more embodiments disclosed herein. Data node A (130A) may be an embodiment of the data nodes (e.g., 130A, 130N, FIG. 1A) discussed above. As discussed above, data node A (130A) may include the functionality to perform computer implemented services. To perform the aforementioned services, data node A (130A) may include a data node controller (132), a vendor agent (134), and storage (140). Data node A (130A) may include other, additional, and/or fewer components without departing from embodiments disclosed herein. Each of the aforementioned components of Data node A (130A) is discussed below.

In one or more embodiments disclosed herein, the data node controller (132) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data node controller (132) described throughout this Detailed Description.

In one or more embodiments disclosed herein, the data node controller (132) is implemented as computer instructions, e.g., computer code, stored on a storage (e.g., 140) that when executed by a processor of data node A (100) causes data node A (130A) to provide the functionality of the data node controller (132) described throughout this Detailed Description.

In one or more embodiments, the data node controller (132) may include the functionality to perform data node management services. To perform the data node management services, the data node controller (132) may: (i) generate, obtain, and update data node information, (ii) obtain, delete, and update unique keys, (iii) obtain, update, and delete certificates, (iv) generate and update term values, and (v) send data cluster modification notifications to the vendor agent (134). The data node controller (132) may further include the functionality to perform all, or a portion of, FIGS. 2A-5. The data node controller (132) may include other and/or additional functionalities without departing from embodiments disclosed herein.

In one or more embodiments disclosed herein, the vendor agent (134) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the vendor agent (134) described throughout this Detailed Description.

In one or more embodiments disclosed herein, the vendor agent (134) is implemented as computer instructions, e.g., computer code, stored on a storage (e.g., 140) that when executed by a processor of data node A (100) causes data node A (130A) to provide the functionality of the vendor agent (134) described throughout this Detailed Description.

In one or more embodiments, the vendor agent (134) may include the functionality to communicate with the data cluster manager (e.g., 100, FIG. 1A), other data nodes (e.g., 130N, FIG. 1A) and perform vendor services. To perform the data node management services, the data node controller (132) may: (i) provide data node information to the data cluster manager (100), (ii) obtain compound certificates from the data cluster manager (e.g., 100, FIG. 1A) and (iii) distribute certificates to other data nodes (e.g., 130N, FIG. 1A) and the data node controller (132). The vendor agent (134) may further include the functionality to perform all, or a portion of, FIGS. 2A-5. The vendor agent (134) may include other and/or additional functionalities without departing from embodiments disclosed herein.

In one or more embodiments, the storage (140) may be implemented using one or more volatile or non-volatile storages or any combination thereof. The storage (140) may include the functionality to, or otherwise be configured to, store and provide all, or portions, of information that may be used by the data node controller (132), the vendor agent (134), and data node A (130A). The information stored in the storage (140) may include one or more data structures including data node information, a vendor certificate associated with the vendor of data node A (130A), unique keys, and a term value (all discussed below in FIGS. 2A-5). The storage may include other and/or additional information without departing from embodiments disclosed herein.

While the data structures mentioned in this Detailed Description are discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (140), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 1C:
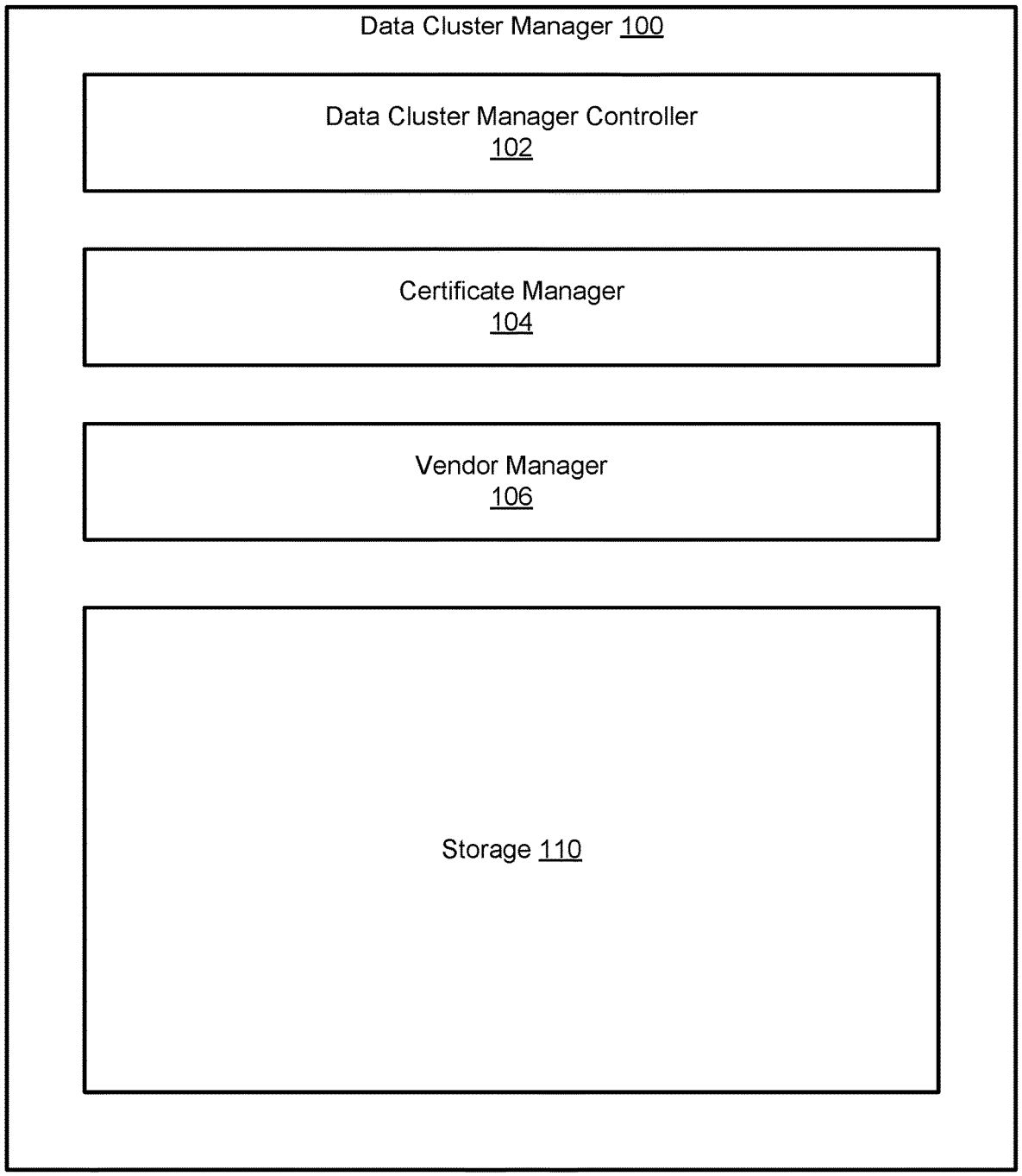
FIG. 1C shows a diagram of a data cluster manager in accordance with one or more embodiments disclosed herein.

FIG. 1C shows a diagram of a data cluster manager in accordance with one or more embodiments disclosed herein. The data cluster manager (100) may be an embodiment of the data cluster manager (100, FIG. 1A) discussed above. As discussed above, the data cluster manager (100) may include the functionality to perform data cluster management services. To perform the aforementioned services, the data cluster manager (100) may include a data cluster manager controller (102), a certificate manager (104), a vendor manager (106), and storage (110). The data cluster manager (100) may include other, additional, and/or fewer components without departing from embodiments disclosed herein. Each of the aforementioned components of the data cluster manager (100) is discussed below.

In one or more embodiments disclosed herein, the data cluster manager controller (102) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data cluster manager controller (102) described throughout this Detailed Description.

In one or more embodiments disclosed herein, the data cluster manager controller (102) is implemented as computer instructions, e.g., computer code, stored on a storage (e.g., 110) that when executed by a processor of the data cluster manager (100) causes the data cluster manager (100) to provide the functionality of the data cluster manager controller (102) described throughout this Detailed Description.

In one or more embodiments, the data cluster manager controller (102) may include the functionality to perform the aforementioned data cluster management services. To perform the data cluster management services, the data cluster manager controller (102) may send/obtain requests and information to/from the vendor agent (e.g., 134, FIG. 1B) of the MVDC (120, FIG. 1A). The data cluster manager controller (102) may perform all, or a portion, of the methods discussed in FIGS. 2A-5. The data cluster manager controller (102) may include other and/or additional functionality without departing from embodiments disclosed herein. For additional information regarding the functionality of the data cluster manager controller (102), refer to FIGS. 2A-5.

In one or more embodiments disclosed herein, the certificate manager (104) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the certificate manager (104) described throughout this Detailed Description.

In one or more embodiments disclosed herein, the certificate manager (104) is implemented as computer instructions, e.g., computer code, stored on a storage (e.g., 110) that when executed by a processor of the data cluster manager (100) causes the data cluster manager (100) to provide the functionality of the certificate manager (104) described throughout this Detailed Description.

In one or more embodiments, the certificate manager (104) may include the functionality to perform certificate services. To perform the certificate services, the certificate manager (104) may generate compound certificates. The certificate manager (104) may perform all, or a portion, of the methods discussed in FIGS. 2A-5. The certificate manager (104) may include other and/or additional functionality without departing from embodiments disclosed herein. For additional information regarding the functionality of the certificate manager (104), refer to FIGS. 2A-5.

In one or more embodiments disclosed herein, the vendor manager (106) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the vendor manager (106) described throughout this Detailed Description.

In one or more embodiments disclosed herein, the vendor manager (106) is implemented as computer instructions, e.g., computer code, stored on a storage (e.g., 110) that when executed by a processor of the data cluster manager (100) causes the data cluster manager (100) to provide the functionality of the vendor manager (106) described throughout this Detailed Description.

In one or more embodiments, the vendor manager (106) may include the functionality to perform vendor services. To perform the vendor services, the vendor manager (106) may communicate with and obtain vendor plugins from the vendors or entities associated with the vendors. The vendor manager (106) may perform all, or a portion, of the methods discussed in FIGS. 2A-5. The vendor manager (106) may include other and/or additional functionality without departing from embodiments disclosed herein. For additional information regarding the functionality of the vendor manager (106), refer to FIGS. 2A-5.

In one or more embodiments, the storage (110) may be implemented using one or more volatile or non-volatile storages or any combination thereof. The storage (110) may include the functionality to, or otherwise be configured to, store and provide all, or portions, of information that may be used by data cluster manager (100) and its components (102, 104, 106) to perform data cluster management services and/or other services without departing from embodiments disclosed herein. The information stored in the storage (110) may include one or more data structures including a vendor plugin repository and a compound certificate (both discussed below). The storage (110) may include other and/or additional information without departing from embodiments disclosed herein.

While the data structures and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (110), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 2A:
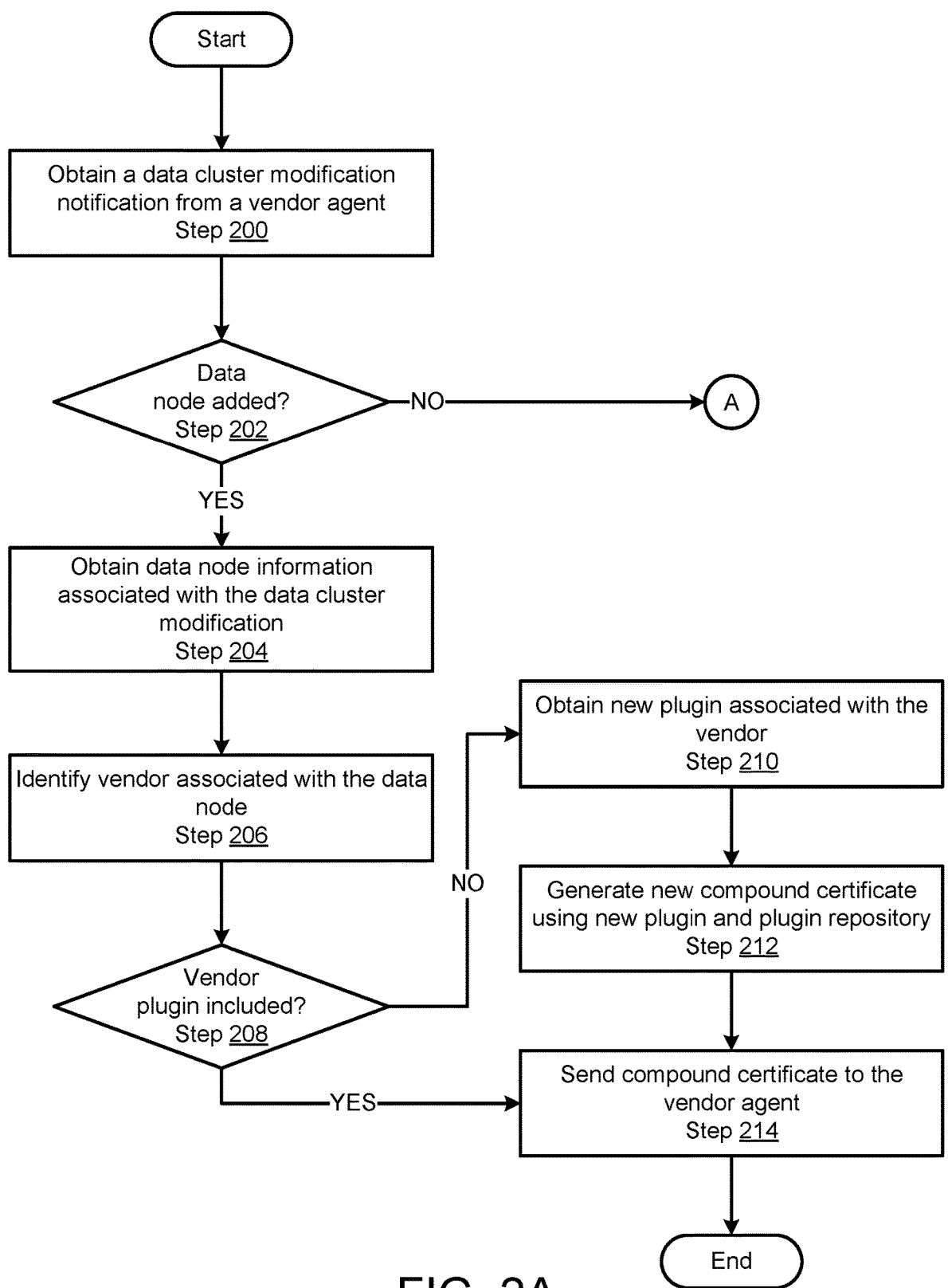
FIGS. 2A-2B show flowcharts of a method for generating a compound certificate in accordance with one or more embodiments disclosed herein.
Figure 2B:
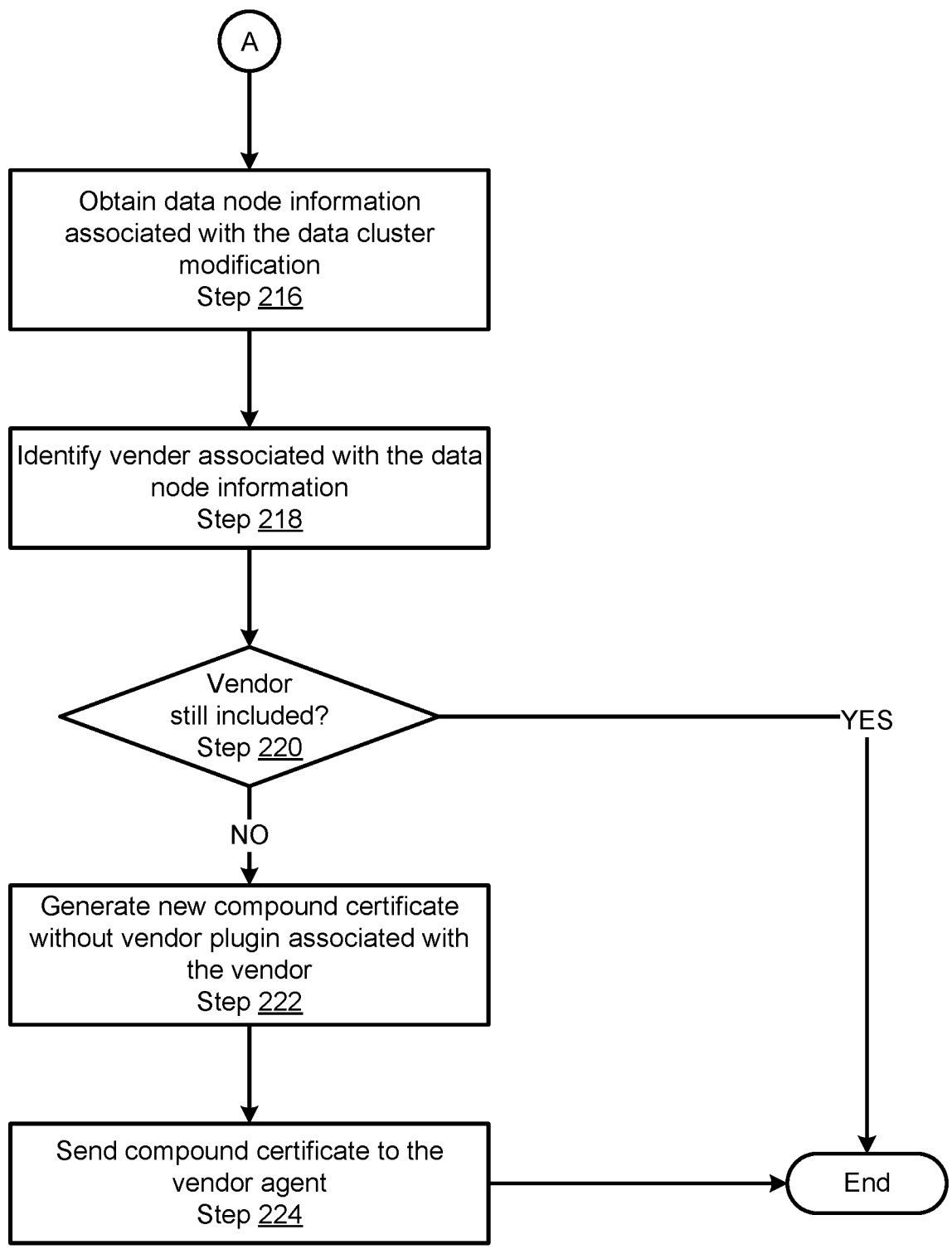

FIGS. 2A-2B show flowcharts of a method for generating a compound certificate in accordance with one or more embodiments disclosed herein. The method shown in FIG. 2A-2B may be performed by, for example, a data cluster manager agent (e.g., 100, FIG. 1A). Other components of the system in FIGS. 1A-1C may perform all, or a portion, of the method of FIGS. 2A-2B without departing from the scope of the embodiments described herein. While FIGS. 2A-2B is illustrated as a series of steps, any of the steps may be omitted, performed in a different order, additional steps may be included, and/or any or all of the steps may be performed in a parallel and/or partially overlapping manner without departing from the scope of the embodiments described herein.

Starting with FIG. 2A, in Step 200, a data cluster modification notification is obtained from a vendor agent. In one or more embodiments, the data cluster manager may obtain a message from the vendor agent. The message may include a notification that the data cluster has been modified. In one or more embodiments, the data cluster modification may include adding or removing a data node to the data cluster. In one or more embodiments, when a data node is added or removed from the data cluster, the data node may notify an active vendor agent in the data cluster by sending a message to the vendor agent using, for example, Link Layer Discovery Protocol (LLDP). In response to obtaining the notification, the vendor agent may then send the message to the data cluster manager including the data cluster modification notification to the data cluster manager. The message may further include data node information (discussed below) associated with the data node that is added or removed. The message may include other and/or additional information associated with the data cluster modification without departing from embodiments disclosed herein. The message may be provided to the data cluster manager using any appropriate method of data transmission without departing from embodiments disclosed herein. For example, the vendor agent may transmit the message as one or more network packets through one or more network devices that operatively connect the vendor agent to the data cluster manager. A data cluster modification notification may be obtained from the vendor agent via other and/or additional methods without departing from embodiments disclosed herein.

In Step 202, a determination is made as to whether a data node has been added. In one or more embodiments, the data cluster manager may the use the data cluster modification notification to determine whether a data node has been added. As discussed above, the message obtained in Step 200 may include data node information. In one or more embodiments, the data node information may include an indication as to whether the data node associated with the data cluster modification was added to the data cluster or removed from the data cluster. The indication may include a tag, flag, status, or any other indication included in a message that indicates whether the data node associated with the data modification was added or removed.

In one or more embodiments, the data cluster manager may parse the data cluster modification notification to identify the indication included in the data cluster modification notification. The data cluster manager may then check the indication. In one or more embodiments disclosed herein, if the indication indicates that the data node associated with the data cluster modification was added, then the data cluster manager may determine that the data node was added. In one or more embodiments disclosed herein, if the indication does not indicate that the data node associated with the data cluster modification was added (e.g., the data node was removed), then the data cluster manager may determine that the data node was not added (e.g., the data node was removed). The determination as to whether the data node was added may be made via other and/or additional methods without departing from embodiments disclosed herein.

In one or more embodiments disclosed herein, if it is determined that the data node was added, then the method proceeds to Step 204. In one or more embodiments disclosed herein, if it is determined that the data node was not added, then the method proceeds to Step 216 in FIG. 2B.

In Step 204, data node information associated with the data cluster modification is obtained. As discussed above, the message obtained in Step 200 including the data cluster modification notification may further include data node information associated with the data node corresponding to the data cluster modification. In alternative embodiments, if the message obtained in Step 200 does not include data node information, then the data cluster manager may request and obtain data node information associated with the data node from the vendor agent. The data node information associated with the data cluster modification may be obtained via other and/or additional methods without departing from embodiments disclosed herein.

In Step 206, a vendor associated with the data node is identified. In one or more embodiments, the data cluster manager may parse and use the data node information to identify the vendor associated with the data node. In one or more embodiments, the data node information may further include a vendor identifier associated with the vendor corresponding to the data node associated with the data node information. In one or more embodiments, the vendor identifier may specify a particular vendor of vendors associated with the data node. The vendor associated with the data node may be identified via other and/or additional methods without departing from embodiments disclosed herein.

In Step 208, a determination is made as to whether a vendor plugin associated with the vendor is included in a vendor plugin repository. In one or more embodiments, the data cluster manager may use the vendor identifier and the vendor plugin repository to determine whether the vendor is included in the vendor plugin repository. The vendor plugin repository may include entries associated with multiple vendors of data nodes in the multi-vendor data cluster. Each entry may include a vendor plugin and a vendor identifier associated with the vendor corresponding to the vendor entry. The data cluster manager may compare the vendor identifier included in the obtained data node information with the vendor identifiers included in the entries of the vendor plugin repository. In one or more embodiments disclosed herein, if the vendor identifier included in the data node information matches a vendor identifier included in an entry of the vendor plugin repository, then the data cluster manager may determine that the vendor plugin associated with the vendor is included in the vendor plugin repository. In one or more embodiments disclosed herein, if the vendor identifier included in the data node information does not match any vendor identifier included in any entry of the vendor plugin repository, then the data cluster manager may determine that the vendor plugin associated with the vendor is not included in the vendor plugin repository. The determination as to whether a vendor plugin associated with the vendor is included in a vendor plugin repository may be made via other and/or additional methods without departing from embodiments disclosed herein.

In Step 210, a new plugin associated with the vendor is obtained. In one or more embodiments, the data cluster manager may send a request to the vendor or an entity (both not shown in the system of FIG. 1A) associated with the vendor corresponding to the vendor identifier included in the data node information. The data cluster manager may include, or otherwise have access to, vendor communication information such as, but not limited to, network addresses, usernames, passwords, encryption keys, etc. that may enable the data cluster manager to transmit information to and from the vendors. In an alternative embodiment, the data node information may further include the vendor communication information. In response to obtaining the request, the vendor may provide the vendor plugin to the data cluster manager. The request and vendor plugin may be transmitted using any appropriate method of data transmission without departing from embodiments disclosed herein. For example, the data cluster manager may transmit the request as one or more network packets through one or more network devices that operatively connect the data cluster manager to the vendor. Similarly, the vendor may transmit the vendor plugin as one or more network packets through one or more network devices that operatively connect the vendor to the data cluster manager. In one or more embodiments, the data cluster manager may generate a new entry in the vendor plugin repository associated with the vendor and include the vendor identifier and the new vendor plugin in new entry. A new vendor plugin may be obtained via other and/or additional methods without departing from embodiments disclosed herein.

In Step 212, a new compound certificate is generated using the new plugin and the plugin repository. In one or more embodiments, the data cluster manager may generate a new compound certificate using all entries in the vendor plugin repository (including the newly generated entry that includes the new vendor plugin obtained in Step 210). In one or more embodiments, the data cluster manager may use any appropriate technique for generating a compound certificate without departing from embodiments disclosed herein. For example, the data cluster manager may pull information from each vendor certificate included in the vendor plugins for each entry in the vendor plugin repository and may create the compound certificate by doing an intersection of the pulled information using a logical combination of the properties associated with each vendor. As a result, the new compound certificate may include certificate information associated with each vendor participating in the multi-vendor data cluster. The data cluster manager may delete the old compound certificate upon the generation of the new compound certificate. A new compound certificate may be generated using the new plugin and the plugin repository via other and/or additional methods without departing from embodiments disclosed herein.

In Step 214, the compound certificate is sent to the vendor agent. In one or more embodiments, the data cluster manager may send a message to the vendor agent. The message may include the compound certificate. In response to obtaining the message including the compound certificate, the vendor agent may then propagate the vendor certificate to all data nodes of the multi-vendor data cluster. The message may be provided to the vendor agent using any appropriate method of data transmission without departing from embodiments disclosed herein. For example, the data cluster manager may transmit the message as one or more network packets through one or more network devices that operatively connect the vendor agent to the data cluster manager. The compound certificate may be sent to the vendor agent via other and/or additional methods without departing from embodiments disclosed herein.

Turning to FIG. 2B, in Step 216, data node information associated with the data cluster modification is obtained. As discussed above, the message obtained in Step 200 including the data cluster modification notification may further include data node information associated with the data node corresponding to the data cluster modification. In alternative embodiments, if the message obtained in Step 200 does not include data node information, then the data cluster manager may request and obtain data node information associated with the data node from the vendor agent. The data node information associated with the data cluster modification may be obtained via other and/or additional methods without departing from embodiments disclosed herein.

In Step 218, a vendor associated with the data node information is identified. In one or more embodiments, the data cluster manager may parse and use the data node information to identify the vendor associated with the data node. In one or more embodiments, the data node information may further include a vendor identifier associated with the vendor corresponding to the data node associated with the data node information. In one or more embodiments, the vendor identifier may specify a particular vendor of vendors associated with the data node. The vendor associated with the data node may be identified via other and/or additional methods without departing from embodiments disclosed herein.

In Step 220, a determination is made as to whether the vendor is still included. In one or more embodiments, the data cluster manager may use the vendor plugin repository to determine whether the vendor is still included in the multi-vendor data cluster. As discussed above, the vendor plugin repository may include entries associated with multiple vendors of data nodes in the multi-vendor data cluster. Each entry may further include a list of data nodes included in the multi-vendor data cluster that are associated with the vendor. When a data node associated with the vendor is removed from the data cluster, the data node identifier associated with the data node is removed from the vendor plugin repository entry associated with the vendor. In one or more embodiments disclosed herein, the data cluster manager may check the vendor agent to obtain the list of data node identifiers corresponding to data nodes associated with the vendor. In one or more embodiments disclosed herein, if the list of data node identifiers only includes one data node identifier associated with the removed data node or includes no data node identifiers, then the data cluster manager determines that the vendor is not still included in the multi-vendor data cluster. In one or more embodiments disclosed herein, if the list of data node identifiers includes other data node identifiers associated with other data nodes, then the data cluster manager determines that the vendor is still included in the multi-vendor data cluster. In one or more embodiments disclosed herein, if the data cluster manager determines that the vendor is not still included, then the data cluster manager may delete or otherwise remove the entry associated with the vendor from the vendor plugin repository. The determination as to whether a vendor is still included in the multi-vendor data cluster may be made via other and/or additional methods without departing from embodiments disclosed herein.

In one or more embodiments disclosed herein, if it is determined that the vendor is still included, then the method may end following Step 220. In one or more embodiments disclosed herein, if it is determined that the vendor is not still included, then the method may proceed to Step 222.

In Step 222, a new compound certificate is generated without the vendor plugin associated with the vendor. In one or more embodiments, the data cluster manager may generate a new compound certificate using all entries in the vendor plugin repository, excluding the recently deleted entry so that the compound certificate is generated without the vendor plugin associated with the vendor that is no longer included in the multi-vendor data cluster as a result of removing the data node associated with the data cluster modification. As such, the compound certificate may be associated with all vendors still included in the multi-vendor data cluster. In one or more embodiments, the data cluster manager may use any appropriate technique for generating a compound certificate without departing from embodiments disclosed herein. For example, the data cluster manager may pull information from each vendor certificate included in the vendor plugins for each entry in the vendor plugin repository and may create the compound certificate by doing an intersection of the pulled information using a logical combination of the properties associated with each vendor. As a result, the new compound certificate may include certificate information associated with each vendor participating in the multi-vendor data cluster. The data cluster manager may delete the old compound certificate upon the generation of the new compound certificate. A new compound certificate may be generated without the vendor plugin associated with the vendor via other and/or additional methods without departing from embodiments disclosed herein.

In Step 224, the compound certificate is sent to the vendor agent. In one or more embodiments, the data cluster manager may send a message to the vendor agent. The message may include the compound certificate. In response to obtaining the compound certificate, the vendor agent may then propagate the vendor certificate to all data nodes of the multi-vendor data cluster. The message may be provided to the vendor agent using any appropriate method of data transmission without departing from embodiments disclosed herein. For example, the data cluster manager may transmit the message as one or more network packets through one or more network devices that operatively connect the vendor agent to the data cluster manager. The compound certificate may be sent to the vendor agent via other and/or additional methods without departing from embodiments disclosed herein.

In one or more embodiments, the method ends following Step 224.

Figure 3:
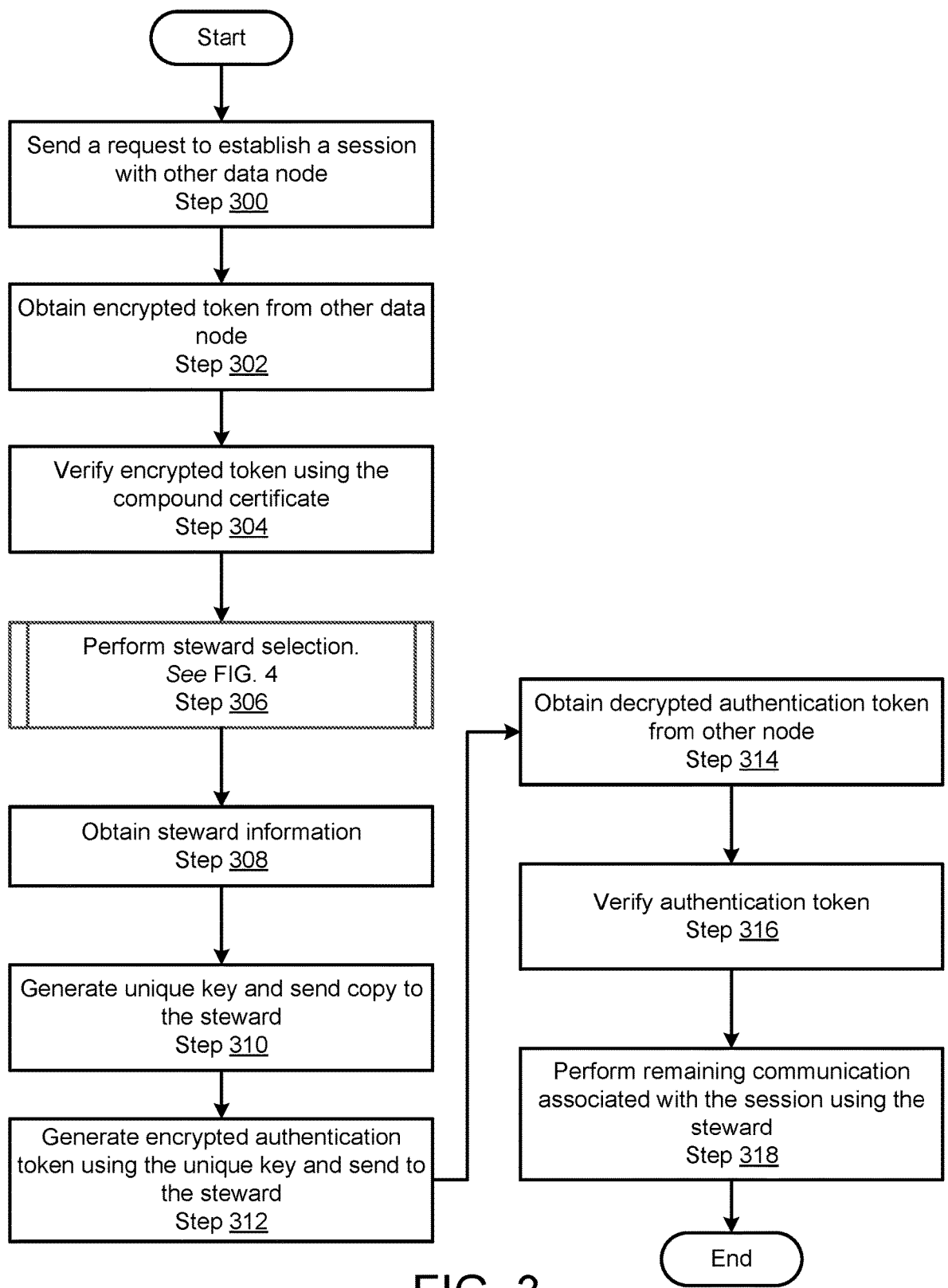
FIG. 3 shows a flowchart of a method for establishing a session in accordance with one or more embodiments disclosed herein.

FIG. 3 shows a flowchart of a method for establishing a session in accordance with one or more embodiments disclosed herein. The method shown in FIG. 3 may be performed by, for example, a data node (e.g., 130A, FIG. 1A). Other components of the system in FIGS. 1A-1C may perform all, or a portion, of the method of FIG. 3 without departing from the scope of the embodiments described herein. While FIG. 3 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 300, a request to establish a session with another data node is sent. In one or more embodiments, the data node may send a request to establish a communication session with another node to the other data node. The data node may include or otherwise have access to communication information (e.g., network addresses, port numbers, etc.) associated with other data nodes in the multi-vendor data cluster to enable communication between nodes. The request may include data node information associated with the data node (e.g., a data node identifier, communication information, etc.). The request may include other and/or additional information without departing from embodiments disclosed herein. The request may be sent to the other data nodes using any appropriate method of data transmission without departing from embodiments disclosed herein. For example, the data node may transmit the request as one or more network packets through one or more network devices that operatively connect the data node to the other data node. A request to establish a session with another data node may be sent via other and/or additional methods without departing from embodiments disclosed herein.

In Step 302, an encrypted token is obtained from the other node. In response to obtaining the request sent in Step 300, the other data node may verify the request by, for example, verifying the packets associated with the request using any appropriate validation technique without departing from embodiments disclosed herein. For example, the other data node may verify that the data node identifier and/or the network address included in one or more of the packets is associated with a data node in the multi-vendor data cluster. Additionally, the other data node may then generate a token. The other data node may then encrypt the token with the vendor key included in the vendor plugin and vender certificate associated with the vendor corresponding to the other data node. The other data node may use any appropriate encryption technique without departing from embodiments disclosed herein. The other data node may then send the encrypted token to the data node. The encrypted token may be provided to the data node using any appropriate method of data transmission without departing from embodiments disclosed herein. For example, the other data node may transmit the encrypted token as one or more network packets through one or more network devices that operatively connect the data node to the other data node. An encrypted token may be obtained from the other node via other and/or additional methods without departing from embodiments disclosed herein.

In Step 304, the encrypted token is verified using the compound certificate. As discussed above, the compound certificate may include certificate information associated with each vendor included in the multi-vendor data cluster. The data node may use the compound certificate, which includes certificate information associated with the vendor of the other data node, to decrypt and verify the encrypted token. Thus, regardless of whether the data node includes the same vendor or a different vender than the other data node, the data node may be able to decrypt and verify the encrypted token generated using the vendor key of the other data node. The data node may verify the decrypted token by, for example, verifying the packets associated with the token using any appropriate validation technique without departing from embodiments disclosed herein. For example, the data node may verify that the data node identifier and/or the network address included in one or more of the packets is associated with the other data node. The encrypted token may be verified using the compound certificate via other and/or additional methods without departing from embodiments disclosed herein.

In Step 306, steward selection is performed. In one or more embodiments, steward selection may be performed using the method discussed below in FIG. 4. For additional information regarding performing steward selection, refer to FIG. 4.

In Step 308, steward information is obtained. In one or more embodiments, the steward (e.g., a non-participating data node of the multi-vendor data cluster selected to facilitate communication in the session via the method of FIG. 4) may provide steward information associated with the steward to the data node and the other data node. The steward information may include the data node identifier, communication information (e.g., network addresses, port numbers, etc.) and/or any other information that may be used by the data node and the other data node (e.g., the participating data nodes) to communicate with the steward during the session without departing from embodiments disclosed herein. The steward information may be provided to the data node by the steward using any appropriate method of data transmission without departing from embodiments disclosed herein. For example, the steward may transmit the steward information as a message that includes one or more network packets through one or more network devices that operatively connect the data node to the steward. The steward information may be obtained via other and/or additional methods without departing from embodiments disclosed herein.

In Step 310, a unique key is generated and a copy of the unique key is sent to the steward. In one or more embodiments, the data node generates a unique key. The data node may generate the unique key using any appropriate encryption key generation algorithm (e.g., using a Random Bit Generator (RBG)) without departing from embodiments disclosed herein. The data node may generate a copy of the unique key and send the copy to the steward. The data node may encrypt the unique key using the vendor key associated with the data node and the steward may decrypt the unique key using the compound certificate. The unique key may be provided to the steward using any appropriate method of data transmission without departing from embodiments disclosed herein. For example, the data node may transmit the unique key as a message that includes one or more network packets through one or more network devices that operatively connect the data node to the steward. A unique key may be generated and a copy of the unique key may be sent to the steward via other and/or additional methods without departing from embodiments disclosed herein.

In Step 312, an encrypted authentication token is generated using the unique key and sent to the steward. In one or more embodiments, the data node may generate an authentication token. The authentication token may be a data structure that includes identify information (e.g., a data node identifier, a username, password, one or more strings, a set of bits, etc.) that may be used to verify the identity of the data nodes participating in the session. The data node may then encrypt the authentication token using the unique key and any appropriate encryption algorithm (e.g., Advanced Encryption Standard (AES), Blowfish, Twofish, etc.) without departing from embodiments disclosed herein. The data node may then send the encrypted authentication token to the steward. The encrypted authentication token may be provided to the steward using any appropriate method of data transmission without departing from embodiments disclosed herein. For example, the data node may transmit the encrypted authentication token as a message that includes one or more network packets through one or more network devices that operatively connect the data node to the steward. An encrypted authentication token may be generated using the unique key and sent to the steward via other and/or additional methods without departing from embodiments disclosed herein.

In one or more embodiments, after obtaining the encrypted authentication token, the steward may decrypt the authentication token with the unique key associated with the data node then re-encrypt the authentication token with the unique key of the other data node. The steward may then provide the re-encrypted authentication token to the other data node. See FIG. 5.

In Step 314, a decrypted authentication token is obtained from the other node. In one or more embodiments, after obtaining the re-encrypted token, the other data node may decrypt the re-encrypted token to obtain a decrypted authentication token. The other data node may then provide the decrypted authentication token to the data node. The decrypted authentication token may be provided to the data node using any appropriate method of data transmission without departing from embodiments disclosed herein. For example, the other data node may transmit the decrypted authentication token as a message that includes one or more network packets through one or more network devices that operatively connect the data node to the other data node. A decrypted authentication token is obtained from the other node via other and/or additional methods without departing from embodiments disclosed herein.

In Step 316, the decrypted authentication token is verified. In one or more embodiments, the data node may include a copy of the original authentication token. The data node may verify the decrypted authentication token by comparing the original authentication token to the decrypted authentication token to ensure that the decrypted authentication token matches the original authentication token. The decrypted authentication token may be verified via other and/or additional methods without departing from embodiments disclosed herein.

In Step 318, remaining communication associated with the session is performed using the steward. In one or more embodiments, the data node may encrypt all remaining communications with the unique key and provide the encrypted communications to the steward. The steward may then decrypt the communications with the copy of the unique key, then re-encrypt the communication with the copy of the unique key associated with the other data node before providing the re-encrypted communications to the other data node. Similarly, the other data node may encrypt all remaining communications with the other unique key and provide the encrypted communications to the steward. The steward may then decrypt the communications with the copy of the other unique key, then re-encrypt the communication with the copy of the unique key associated with the data node before providing the re-encrypted communications to the data node. Upon termination of the session, all unique keys and authentication tokens may be deleted by the data node, the other data node, and the steward. The remaining communication associated with the session may be performed using the steward via other and/or additional methods without departing from embodiments disclosed herein.

In one or more embodiments disclosed herein, the method ends following Step 318.

Figure 4:
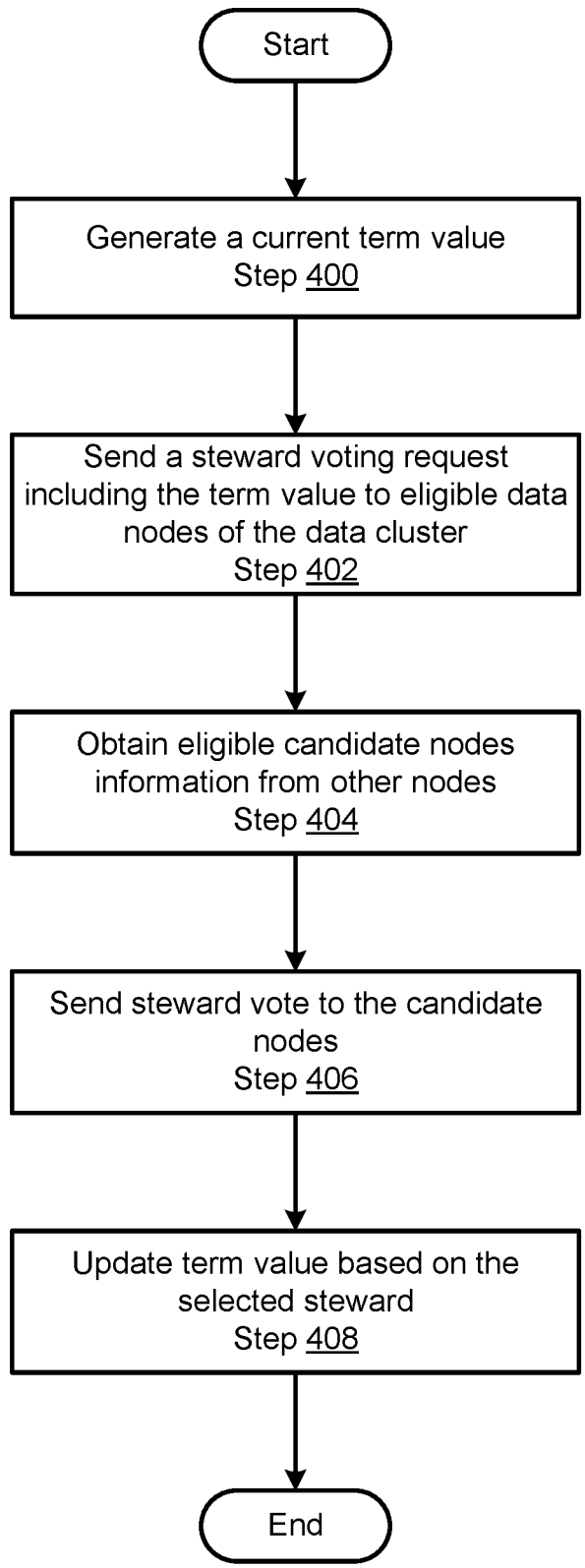
FIG. 4 shows a flowchart of a method for performing steward selection in accordance with one or more embodiments disclosed herein.

FIG. 4 shows a flowchart of a method for performing steward selection in accordance with one or more embodiments disclosed herein. The method shown in FIG. 4 may be performed by, for example, a data node (e.g., 130A, FIG. 1A). Other components of the system in FIGS. 1A-1C may perform all, or a portion, of the method of FIG. 4 without departing from the scope of the embodiments described herein. While FIG. 4 is illustrated as a series of steps, any of the steps may be omitted, performed in a different order, additional steps may be included, and/or any or all the steps may be performed in a parallel and/or partially overlapping manner without departing from the scope of the embodiments described herein.

Initially, in Step 400, a current term value is generated. In one or more embodiments, the data node may generate a term value. The term value may be a numerical representation of the ability of, or user-desire for, a data node to act as a steward during a communication session. The term value may be generated based on one or more attributes and/or policies associated with term values. The term value may be a single numerical value generated using a term value generation algorithm using one or more attributes or policies. Alternatively, the term value may be multiple numerical values generated by a term value generation algorithm using one or more of the attributes or policies. The attributes may include the current workload(s) executing on the data node (e.g., the type and quantity) and/or the percentage of, or raw availability of, computing resources (e.g., processor utilization, memory utilization, available network bandwidth, available storage capacity, etc.) of the data node. The policies may include healthy systems only (e.g., only data nodes that are designated healthy by a health monitor associated with the data nodes may generate a term value or the amount and severity of health issues associated with a data node may lower the term value associated with the data node), wear level (e.g., the more wear such as IO operations, processor cycles, etc., the lower the corresponding term value), type and/or quantity of computing resources (hardware such as processors, storage devices, memory devices, graphics processing units or graphics cards, etc. and/or software such as VMs, applications, operating systems, hypervisors, etc.) included in the data node, and/or an energy-cost associated with the data node (e.g., the past or future predicted power output of the data node). Any term value generation algorithm using one or more of the aforementioned attributes and/or policies may be used to generate the term value without departing from embodiments disclosed herein.

As a simple example, a first data node may include only one workload that includes training machine learning model and is using over 70 percent of its computing resources. A second data node may include executing an email application and is using less than 25 percent of its computing resources. The term value generation algorithm may add to the term value: 1 for machine learning workload, 10 for an email application workload, 5 for less than 50 percent available computing resources, and 10 for more than 50 percent available computing resources. The first data node may generate a term value of 6 by adding 1 (workload type) and 5 (available computing resources), while the second data node may generate a term value of 20 by adding 10 (workload type) and 10 (available computing resources). The current term value may be generated via other and/or additional methods without departing from embodiments disclosed herein.

In Step 402, a steward voting request including the term value is sent to eligible data nodes of the data cluster. As discussed above, the data node may include, or otherwise have access to, communication information (e.g., network addresses, port numbers, etc.) associated with other data nodes in the multi-vendor data cluster to enable communication between nodes. In one or more embodiments, the data node may generate a steward voting request. The steward voting request may further include the term value associated with the data node. The data node may send the steward voting request to eligible data nodes of the multi-vendor data cluster. The eligible data nodes may include: (i) all of the data nodes of the multi-vendor data cluster, (ii) data nodes that are active, and/or (iii) data nodes that include a required computing resource and/or data. The eligible data nodes may include other and/or additional combinations of data nodes of the multi-vendor data cluster without departing from embodiments disclosed herein. The steward voting request may be sent to the other data nodes using any appropriate method of data transmission without departing from embodiments disclosed herein. For example, the data node may transmit the steward voting request as messages that include one or more network packets through one or more network devices that operatively connect the data node to the other data nodes. A steward voting request including the term value may be sent to eligible data nodes of the data cluster via other and/or additional methods without departing from embodiments disclosed herein.

In Step 404, eligible candidate node information is obtained from other nodes. In one or more embodiments, the data node may obtain eligible candidate node information from all of eligible candidate nodes of the multi-vendor data cluster. The eligible candidate node information may be one or more data structures that include a data node identifier and a term value associated with each of the eligible candidate nodes. The eligible candidate node information may include other and/or additional information without departing from embodiments disclosed herein. The eligible candidate node information may be sent to the data node by the eligible candidate nodes using any appropriate method of data transmission without departing from embodiments disclosed herein. For example, the eligible candidate nodes may transmit the eligible candidate node information as messages that include one or more network packets through one or more network devices that operatively connect the data node to the other eligible candidate nodes. Eligible candidate node information may be obtained from other nodes via other and/or additional methods without departing from embodiments disclosed herein.

In Step 406, a steward vote is sent to the candidate nodes. In one or more embodiments, the data node may parse the eligible candidate node information. The data node may then compare its term value with the term values included in the eligible candidate node information. The data node may then generate a steward vote (e.g., an indication of the eligible data node for which the data node is voting to be a steward such as the corresponding data node identifier) for the eligible candidate node that has the highest term value (including itself if the data node has the highest term value among the eligible candidate nodes). The data node may then send the steward vote to the eligible candidate nodes. The eligible steward vote may be sent to the eligible candidate nodes by the data node using any appropriate method of data transmission without departing from embodiments disclosed herein. For example, the data node may transmit the steward vote as messages that include one or more network packets through one or more network devices that operatively connect the data node to the other eligible candidate nodes. Every other candidate node may also cast a steward vote using the methods discussed above. The steward vote may be sent to the candidate nodes via other and/or additional methods without departing from embodiments disclosed herein.

In Step 408, the term value is updated based on the selected steward. In one or more embodiments, if the data node itself was not selected as the steward, the data node may update its term value to match the term value of the selected steward and start from the updated term value when generating a new term value for future steward selection. Alternatively, if the data node itself was not selected as the steward, the data node may increment its term value by a set or configurable increment value and start from the updated term value when generating a new term value for future steward selection. If the data node was selected as the candidate node, the data node may not update its current term value. The term value may be updated based on the steward selection via other and/or additional methods without departing from the embodiments disclosed herein.

In one or more embodiments disclosed herein, the method ends following Step 408. Each eligible candidate node may perform all, or a portion of, the method of FIG. 4 to perform steward selection.

Figure 5:
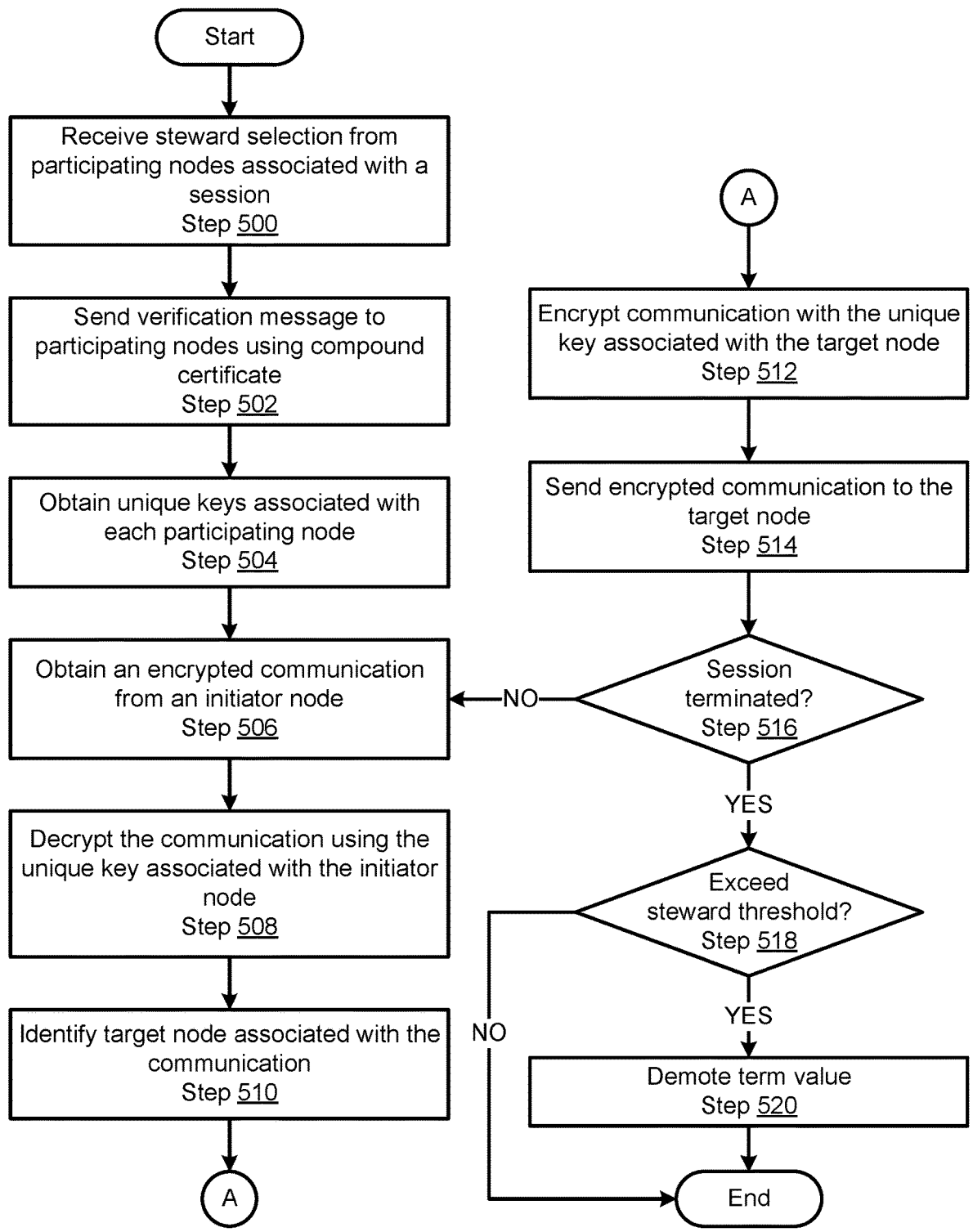
FIG. 5 shows a flowchart of a method for managing a session in accordance with one or more embodiments disclosed herein.

FIG. 5 shows a flowchart of a method for managing a session in accordance with one or more embodiments disclosed herein. The method shown in FIG. 5 may be performed by, for example, a data node (e.g., 130A, FIG. 1A). Other components of the system in FIGS. 1A-1C may perform all, or a portion, of the method of FIG. 5 without departing from the scope of the embodiments described herein. While FIG. 5 is illustrated as a series of steps, any of the steps may be omitted, performed in a different order, additional steps may be included, and/or any or all the steps may be performed in a parallel and/or partially overlapping manner without departing from the scope of the embodiments described herein.

Initially, in Step 500, a steward selection is obtained from participating nodes associated with a session. In one or more embodiments, the data node may receive a message indicating that it has been selected as a steward from one or more data nodes participating in the steward selection and/or the communication session. The message may further include the data node identifiers associated with the data nodes participating in the communication session. The steward selection may be sent to the data node using any appropriate method of data transmission without departing from embodiments disclosed herein. For example, the one or more other data nodes may transmit the steward selection as a message that includes one or more network packets through one or more network devices that operatively connect the data node to the other data node(s). A steward selection may be obtained from participating nodes associated with a session via other and/or additional methods without departing from embodiments disclosed herein.

In Step 502, a verification message is sent to the participating nodes using the compound certificate. In one or more embodiments disclosed herein, the data node may generate a message. The message may indicate that the data confirms the steward selection. The message may include the data node identifier associated with the data node and one or more data node identifiers associates with the participating nodes (e.g., the nodes participating in the communication session). The message may include other verification information (e.g., passcodes, usernames, etc.). The data node may encrypt the verification message using the compound certificate and an encryption algorithm. The encryption algorithm may include any appropriate encryption algorithm (e.g., Advanced Encryption Standard (AES), Blowfish, Twofish, etc.) without departing from embodiments disclosed herein. The verification message may be sent to the participating nodes using any appropriate method of data transmission without departing from embodiments disclosed herein. For example, the data node may transmit the verification message as one or more network packets through one or more network devices that operatively connect the data node to the participating node(s). A verification message may be sent to the participating nodes using the compound certificate via other and/or additional methods without departing from embodiments disclosed herein.

In Step 504, unique keys associated with each participating node are obtained. In one or more embodiments, in response to receiving and verifying the verification message, each of the participating nodes may generate and send a unique key to the data node acting as the steward. For additional information regarding this step, refer to Step 310 of FIG. 3.

In Step 506, an encrypted communication is obtained from an initiator node. In one or more embodiments, an initiator node (e.g., a participating node sending a communication to another participating node) may send the encrypted communication to the steward. The encrypted communication may be encrypted using the unique key associated with the initiator node. The encrypted communication may be sent to the data node using any appropriate method of data transmission without departing from embodiments disclosed herein. For example, the initiator node may transmit the encrypted communication as one or more network packets through one or more network devices that operatively connect the data node to the initiator node. An encrypted communication may be obtained from an initiator node via other and/or additional methods without departing from embodiments disclosed herein.

In Step 508, the encrypted communication is decrypted using the unique key associated with the initiator node. As discussed above, the data node includes a copy of each unique associated with each of the participating nodes. The decrypts the encrypted communication using the unique key associated with the initiator node and an encryption algorithm. Any appropriate encryption algorithm (e.g., Advanced Encryption Standard (AES), Blowfish, Twofish, etc.) may be used to decrypt the encrypted communication using the unique key associated with the initiator node without departing from embodiments disclosed herein.

In Step 510, a target node associated with the communication is identified. In one or more embodiments, the communication may include a data node identifier specifying a target node of the participating nodes to which the communication is to be sent. There may be one or more target nodes without departing from embodiments disclosed herein. The data node may identify the data node associated with the identified data node identifier as the target node. A target node associated with the communication may be identified via other and/or additional methods without departing from embodiments disclosed herein.

In Step 512, the communication is encrypted using the unique key associated with the target node. In one or more embodiments, the data node may encrypt the communication using the unique key associated with the target node and any appropriate encryption algorithm (e.g., Advanced Encryption Standard (AES), Blowfish, Twofish, etc.) without departing from embodiments disclosed herein. The communication may be encrypted using the unique key associated with the target node via other and/or additional methods without departing from embodiments disclosed herein.

In Step 514, the encrypted communication is sent to the target node. In one or more embodiments, the data node may send the encrypted communication to the target node. The encrypted communication may be provided to the target node using any appropriate method of data transmission without departing from embodiments disclosed herein. For example, the data node may transmit the encrypted communication as a message that includes one or more network packets through one or more network devices that operatively connect the data node to the target node. The encrypted communication may be sent to the target node via other and/or additional methods without departing from embodiments disclosed herein.

In Step 516, a determination is made as to whether the session has been terminated. In one or more embodiments, the data node may obtain a termination message from one or more participating nodes indicating that the communication session is terminating. In one or more embodiments disclosed herein, if the data node obtains a termination message, then the data node may determine that the communication session is terminated. In one or more embodiments disclosed herein, if the data node has not obtained a termination message, then the data node may determine that the communication session is terminated. The determination as to whether the session has been terminated may be made via other and/or additional methods without departing from embodiments disclosed herein.

In one or more embodiments disclosed herein, if it is determined that the session has been terminated, then the method proceeds to Step 518. In one or more embodiments disclosed herein, if it is determined that the session has not been terminated, then the method proceeds to Step 506.

In Step 518, a determination is made as to whether a steward threshold is exceeded. In one or more embodiments, the data node may count the amount of times it has been selected as a steward and/or the amount of time since the last time it was selected as a steward before the current time. The data node may compare the amount of times it has been selected as a steward and/or the amount of time since the last time it was selected as a steward before the current time with a steward threshold. The steward threshold may be one or more data structures that includes a steward count limit and/or a steward time limit. In one or more embodiments disclosed herein, if the amount of times it has been selected as a steward and/or the amount of time since the last time it was selected as a steward before the current time violates the steward threshold (e.g., count is above the steward count limit and/or the time period is shorter than the steward time limit), then the data node may determine that the steward threshold is exceeded. In one or more embodiments disclosed herein, if the amount of times it has been selected as a steward and/or the amount of time since the last time it was selected as a steward before the current time do not violate the steward threshold (e.g., count is equal to or below the steward count limit and/or the time period is greater than or equal to the steward time limit), then the data node may determine that the steward threshold is not exceeded. The determination as to whether a steward threshold is exceeded may be made via other and/or additional methods without departing from embodiments disclosed herein.

In one or more embodiments disclosed herein, if it is determined that the steward threshold is exceeded, then the method proceeds to Step 520. In one or more embodiments disclosed herein, if it is determined that the steward threshold is not exceeded, then the method ends following Step 518.

In Step 520, the term value is demoted. In one or more embodiments, the data node may demote its term value. Demoting the term value may include: (i) setting the term value to zero, or (ii) decrementing the term value by a set or configurable decrement value. The term value may be demoted via other and/or additional methods without departing from embodiments disclosed herein.

In one or more embodiments disclosed herein, the method ends following Step 520.

Figure 6:
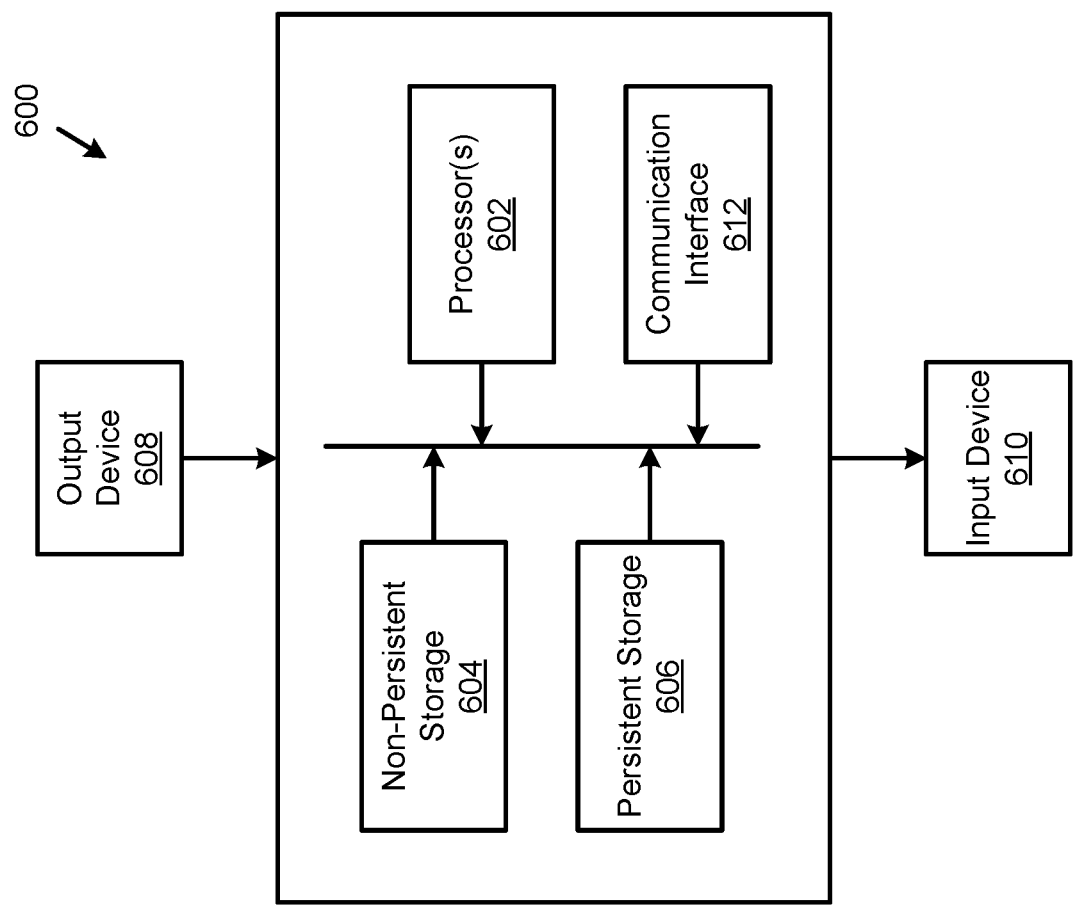
FIG. 6 shows a diagram of a computing device in accordance with one or more embodiments disclosed herein.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606).

Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an identifier may refer to a unique combination of alphanumeric characters associated with an entity that specifies that particular entity. The identifier may be local (usable by a single component) or global (usable by multiple or all components).

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for establishing a communication session, comprising:
    sending, by a first data node of a data cluster, a request to establish a session to a second data node of the data cluster, wherein the request is encrypted using a compound certificate associated with the data cluster;
    obtaining, in response to the request, an encrypted token from the second data node;
    verifying the encrypted token using the compound certificate;
    performing steward selection to select a third data node of the data cluster to be a steward;
    generating a unique key and providing a copy of the unique key to the steward;
    generating an encrypted authentication token using the unique key;
    sending the encrypted authentication token to the steward;
    obtaining an authentication token from the second data node, wherein the authentication token is decrypted;
    verifying the authentication token using the encrypted authentication token; and
    performing remaining communications associated with the session using the steward.

2. The method of claim 1, wherein the compound certificate is generated using a plurality of vendor keys associated with a plurality of vendors.

3. The method of claim 2, wherein:
    the first data node is associated with a first vendor of the plurality of vendors, and
    the second data node is associated with a second vendor of the plurality of vendors.

4. The method of claim 1, further comprising:
    prior to sending, by the first data node of the data cluster, the request to establish the session to the second data node:
        obtaining, by a data cluster manager associated with the data cluster, a data cluster modification notification from a vendor agent;
        making a first determination that the data cluster modification notification is associated with an added data node to the data cluster;
        in response to making the first determination, obtaining data node information associated with the added data node;
        identifying a vendor of a plurality of vendors associated with the added data node;
        making a second determination that a vendor plugin associated with the vendor is not included in a vendor plugin repository;
        in response to the making the second determination, obtaining a new plugin associated with the vendor;
        generating the compound certificate using the new plugin and the vendor plugin repository; and
        sending the compound certificate the vendor agent.

5. The method of claim 4, wherein:
    the vendor agent executes on the first data node,
    the vendor agent is active,
    a second vendor agent executes on the second data node, and
    the second vendor agent is inactive.

6. The method of claim 4, wherein the vendor agent provides the compound certificate to the first data node and the second data node.

7. The method of claim 1, wherein performing the steward selection to select the third data node of the data cluster to be the steward comprises:
    generating, by the first data node, a first term value associated with the first data node;
    initiating, by the first data node, voting between the first data node, the second data node, the third data node, and a fourth data node of the data cluster; and
    voting, by the first data node, for the third data node based on a third term value associated with the third data node.

8. The method of claim 7, wherein:
    the second data node is associated with a second term value, and
    the fourth data node is associated with a fourth term value.

9. The method of claim 8, wherein the third term value is greater than the first term value, the second term value, and the fourth term value.

10. The method of claim 9, wherein the third term value is generated based on at least one of a group consisting of:
a current workload associated with the third data node,
an availability of a desired computing resource associated with the third data node, a health indicator of the third data node,
a number of prior steward selections associated with the third data node,
a period of time since a previous steward selection associated with the third data node,
a wear level associated with the third data node, and
an energy cost associated with the third data node.

11. A non-transitory computer readable medium comprising computer readable program code, which when executed by a computer processor enables the computer processor to perform a method comprising:
sending, by a first data node of a data cluster, a request to establish a session to a second data node of the data cluster, wherein the request is encrypted using a compound certificate associated with the data cluster;
obtaining, in response to the request, an encrypted token from the second data node;
verifying the encrypted token using the compound certificate;
performing steward selection to select a third data node of the data cluster to be a steward;
generating a unique key and providing a copy of the unique key to the steward;
generating an encrypted authentication token using the unique key;
sending the encrypted authentication token to the steward;
obtaining an authentication token from the second data node, wherein the authentication token is decrypted;
verifying the authentication token using the encrypted authentication token; and
performing remaining communications associated with the session using the steward.

12. The non-transitory computer readable medium of claim 11, wherein the compound certificate is generated using a plurality of vendor keys associated with a plurality of vendors.

13. The non-transitory computer readable medium of claim 12, wherein:
the first data node is associated with a first vendor of the plurality of vendors, and
the second data node is associated with a second vendor of the plurality of vendors.

14. The non-transitory computer readable medium of claim 11, further comprising:
prior to sending, by the first data node of the data cluster, the request to establish the session to the second data node:
obtaining, by a data cluster manager associated with the data cluster, a data cluster modification notification from a vendor agent;
making a first determination that the data cluster modification notification is associated with an added data node to the data cluster;
in response to making the first determination, obtaining data node information associated with the added data node;
identifying a vendor of a plurality of vendors associated with the added data node;
making a second determination that a vendor plugin associated with the vendor is not included in a vendor plugin repository;
in response to the making the second determination, obtaining a new plugin associated with the vendor;
generating the compound certificate using the new plugin and the vendor plugin repository; and
sending the compound certificate the vendor agent.

15. The non-transitory computer readable medium of claim 14, wherein:
the vendor agent executes on the first data node,
the vendor agent is active,
a second vendor agent executes on the second data node, and
the second vendor agent is inactive.

16. The non-transitory computer readable medium of claim 14, wherein the vendor agent provides the compound certificate to the first data node and the second data node.

17. The non-transitory computer readable medium of claim 11, wherein performing the steward selection to select the third data node of the data cluster to be the steward comprises:
generating, by the first data node, a first term value associated with the first data node;
initiating, by the first data node, voting between the first data node, the second data node, the third data node, and a fourth data node of the data cluster; and
voting, by the first data node, for the third data node based on a third term value associated with the third data node.

18. The non-transitory computer readable medium of claim 17, wherein:
the second data node is associated with a second term value, and
the fourth data node is associated with a fourth term value.

19. The non-transitory computer readable medium of claim 18, wherein the third term value is greater than the first term value, the second term value, and the fourth term value.

20. The non-transitory computer readable medium of claim 19, wherein the third term value is generated based on at least one of a group consisting of:
a current workload associated with the third data node,
an availability of a desired computing resource associated with the third data node,
a health indicator of the third data node,
a number of prior steward selections associated with the third data node,
a period of time since a previous steward selection associated with the third data node,
a wear level associated with the third data node, and
an energy cost associated with the third data node.

* * * * *